March 16, 1943.   J. E. CASNER   2,314,076
VEHICLE SUSPENSION
Filed Nov. 12, 1941   4 Sheets-Sheet 1
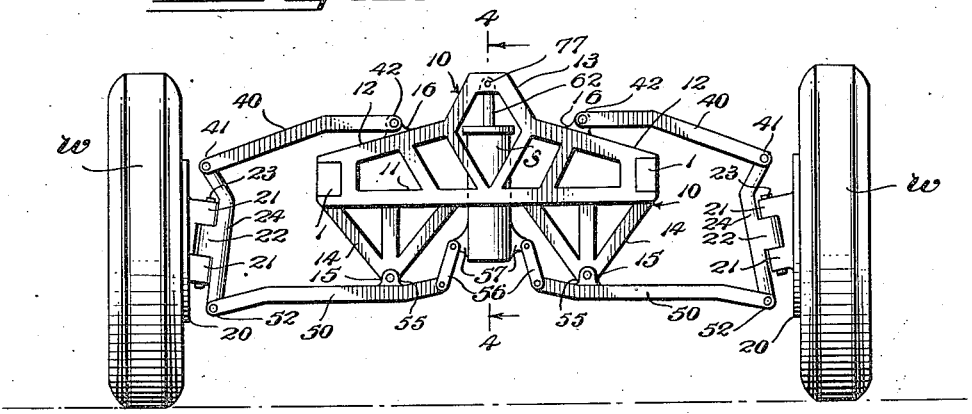
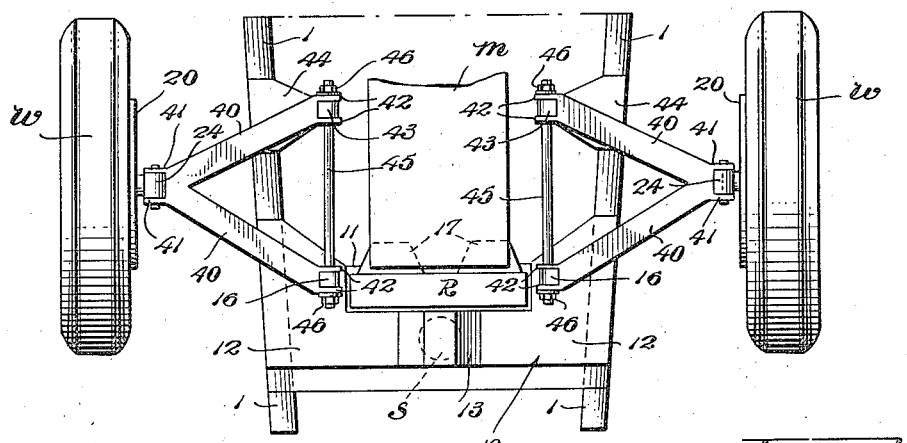
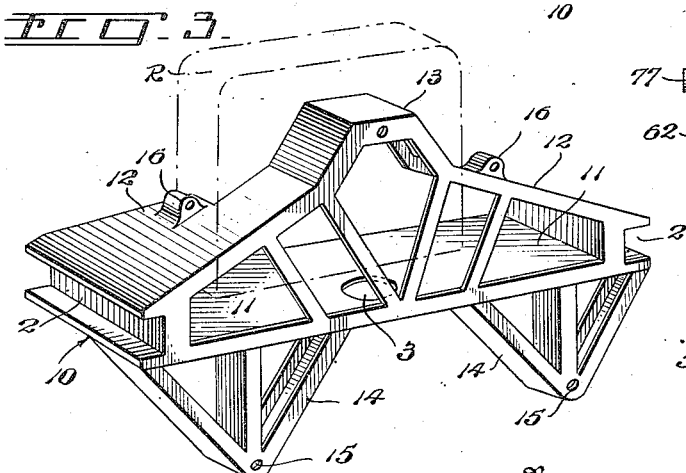
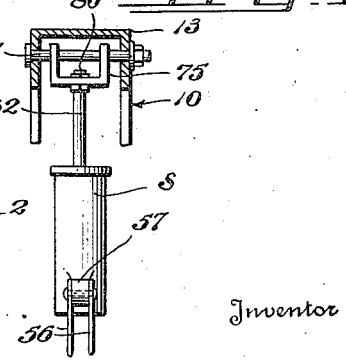
Inventor
JAMES E. CASNER
By H. G. Lombard
Attorney

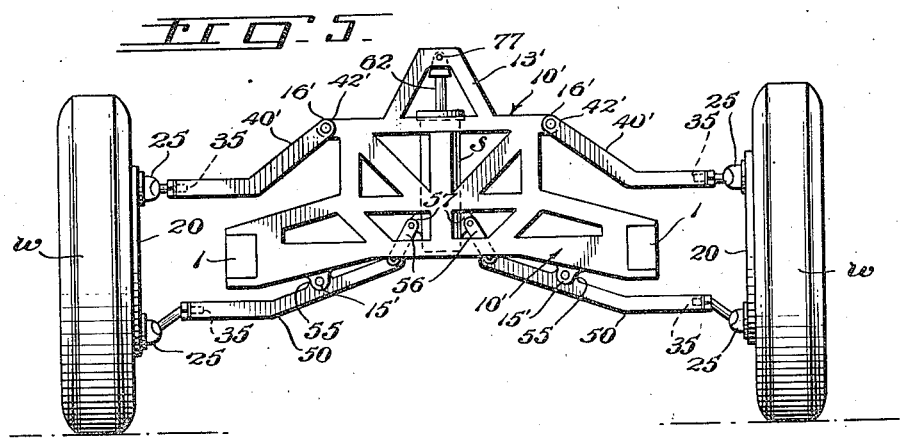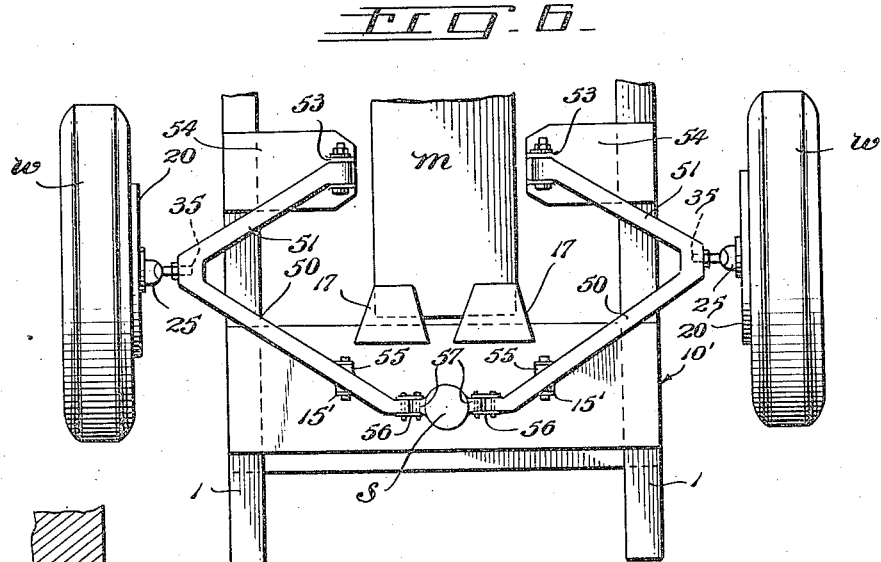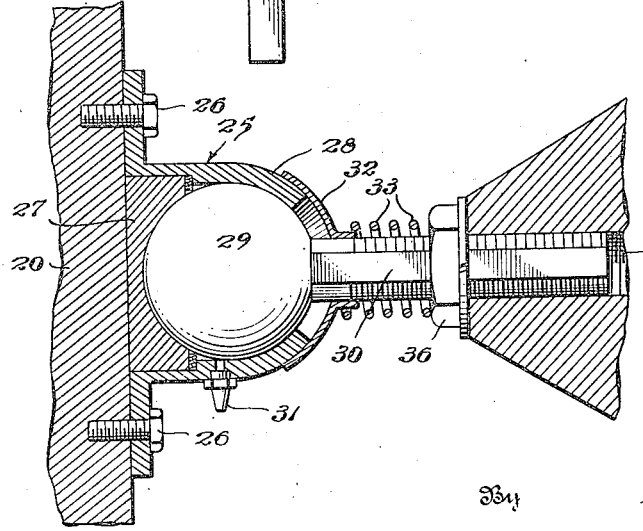

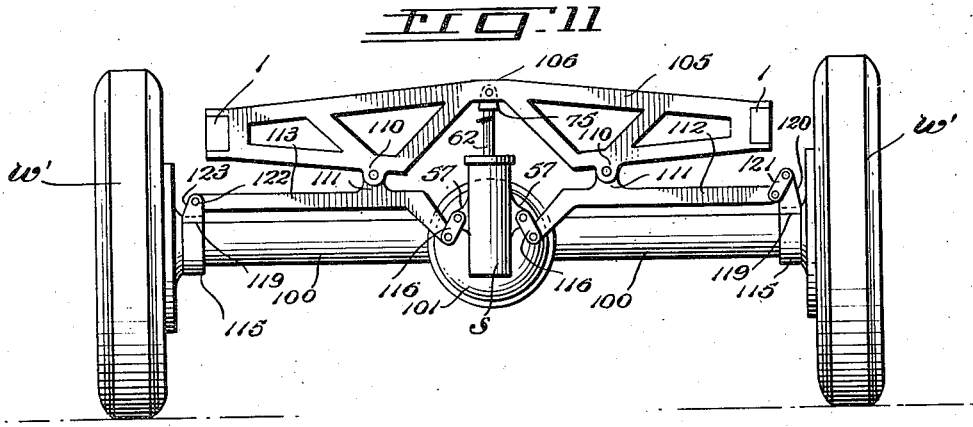
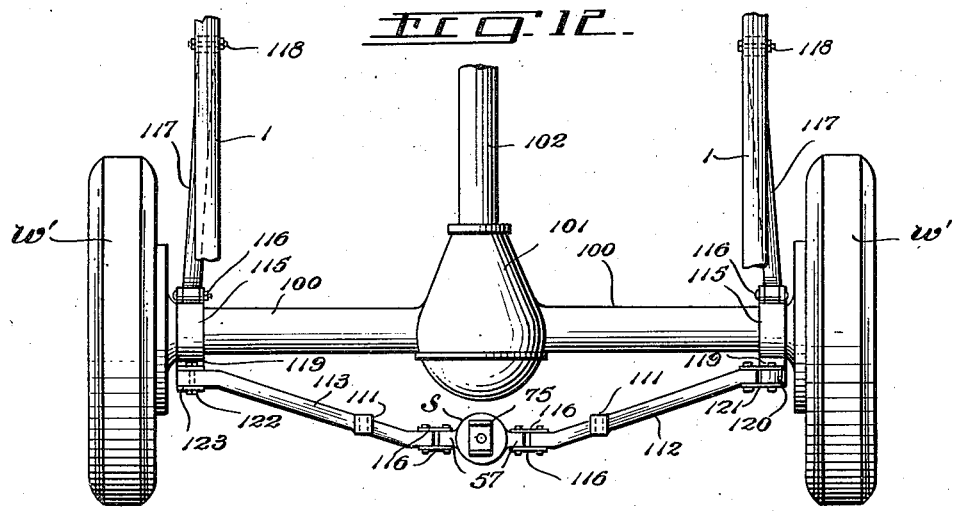
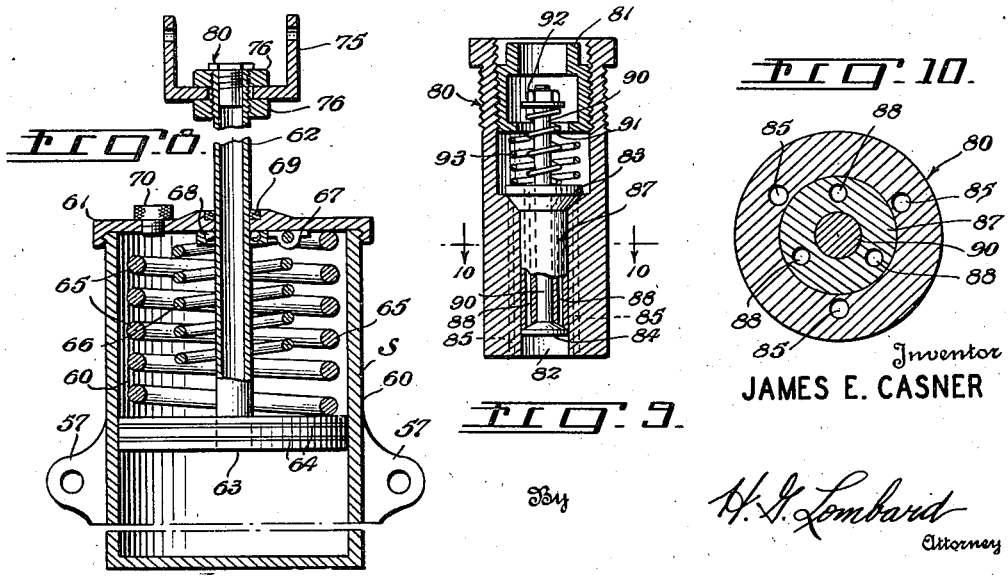

March 16, 1943.　　J. E. CASNER　　2,314,076
VEHICLE SUSPENSION
Filed Nov. 12, 1941　　4 Sheets-Sheet 4
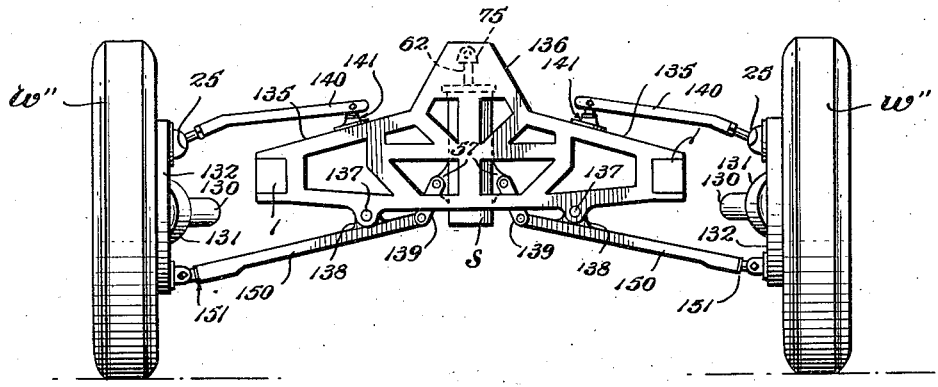
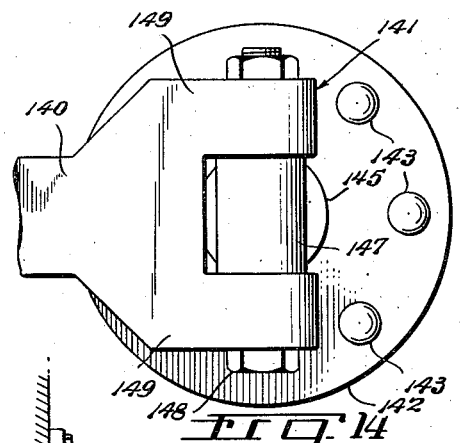
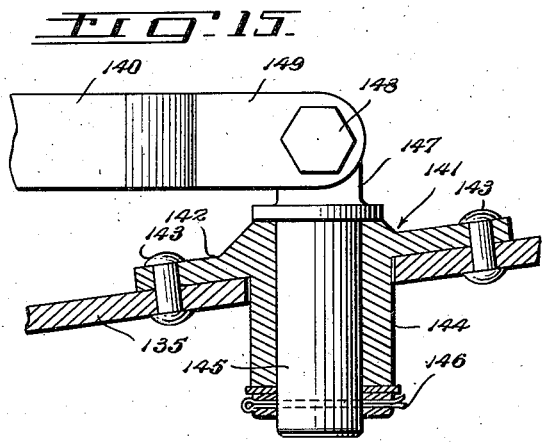
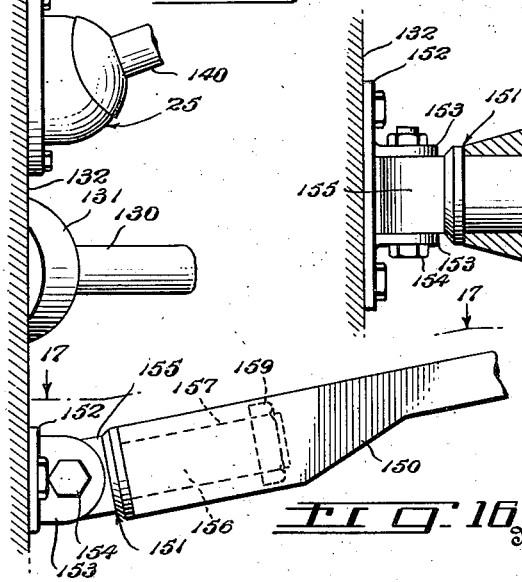
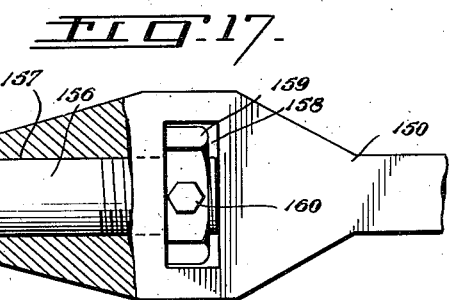
Inventor
JAMES E. CASNER
H. G. Lombard
Attorney Patented Mar. 16, 1943

2,314,076

UNITED STATES PATENT OFFICE 2,314,076

VEHICLE SUSPENSION

James E. Casner, Alpine, Tex.

Application November 12, 1941, Serial No. 418,824

12 Claims. (Cl. 267—11)

This invention relates in general to suspension means for vehicles such as automobiles, and the like, and is directed, more particularly, to an improved spring suspension and shock absorbing construction associated with the vehicle wheels for absorbing and neutralizing road shock in a manner to ensure smooth, comfortable riding qualities to the vehicle body.

The invention contemplates, generally, a stabilizing means which is designed for all types of vehicle bodies supported by a pair of laterally spaced wheels such as the front or rear wheels of a motor vehicle or the landing wheels of an aeroplane, and which is operative to equalize the load on the wheels at all times, and otherwise, is so constructed that all road shock will be absorbed or distributed thereby over the running gear and thereby prevented from being transmitted to the vehicle body.

The frame of the vehicle in accordance with the invention is held in an approximately balanced position at all times as the wheels mutually accommodate themselves to any uneven or irregular surface in the road, thus ensuring smooth riding qualities to the vehicle body and consequently, a maximum of comfort to the occupants thereof. At the same time, there is reduced the tendency for inequality of wear on the tires and in the tendency for the wheels to slip or skid when the vehicle rounds a curve or turns a corner at high speed.

A primary object of the invention is to provide an improved suspension for a vehicle body comprising running gear including a pair or more of opposed or laterally spaced wheels and a spring suspension unit associated with the vehicle chassis frame intermediate the pair of wheels for the transmission of road shock from one wheel to the other in a manner whereby said wheels are capable of mutually balancing one another while the shock otherwise is dampened and substantially neutralized between the wheels.

Another object of the invention is for the provision of such a vehicle body suspension embodying a combined spring suspension and shock absorbing unit intermediate the pair of wheels adapted to absorb and reduce the effects of road shock to either wheel while such shock otherwise is distributed across the running gear and thereby prevented from being transmitted to the vehicle body. This method of suspension provides, further, for a relatively slight, generally perpendicular or gentle rising and falling motion longitudinally of the associated vehicle frame structure any time either wheel passes over an obstruction or irregularity in the road, while said suspension otherwise prevents torsional twists in the frame itself with the consequent advantage that a lighter frame structure may be employed.

A further, more specific object of the invention comprehends in a vehicle having at least two wheels at opposite sides thereof, the combination of a chassis frame and axles for each of the wheels and a spring suspension and shock absorbing unit in operative interposition between the chassis frame and the axles for distributing the vehicle weight between the wheels and for transferring the thrust of road shock from one axle to the other in a manner whereby the opposed thrust from the axles mutually balance each other. The invention is equally applicable in the case of wheels independently mounted on separate axles or on opposite ends of an axle extending across the vehicle body, and accordingly, it will be understood in the description that any reference to the wheel supporting means refers to either type of wheel mounting.

It will be appreciated, further, that the improved vehicle suspension embodying the spring suspension and shock absorbing unit of the present invention is designed to accommodate automatically any variations in load or shifting of load, or any variations due to centrifugal force as when rounding a curve or turning a corner, and to any variations from change of inertia incidental to sudden stopping or starting of the vehicle.

Further objects and advantages, and other new and useful features in the construction, arrangement and general combination of parts of the invention will be readily apparent to those skilled in the art as the description proceeds with reference to the accompanying drawings, in which like reference characters designate like parts throughout the same, and in which:

Fig. 1 is a front elevational view of one form of the invention embodying the combined spring suspension and shock absorbing unit suspended from the vehicle chassis in association with the steering wheels of the vehicle;

Fig. 2 is a top plan view of Fig. 1;

Fig. 3 is a perspective of the cross-frame member shown in Figs. 1 and 2;

Fig. 4 is a fragmentary sectional view of the cross-frame member showing in detail the pivotal mounting of the spring suspension and shock absorbing unit on the vehicle chassis;

Fig. 5 is a view similar to Fig. 1 illustrating another embodiment of the invention for supporting the steering wheels of the vehicle;

Fig. 6 is a bottom plan view of Fig. 5; and,

Fig. 7 is a sectional view showing in detail the ball and socket coupling employed in the embodiment of Figs. 5 and 6.

Fig. 8 is a sectional view showing in detail the construction of the spring suspension and shock absorbing unit;

Fig. 9 is a detailed sectional view of the two-way adjustable pressure and vacuum relief valve of the spring suspension and shock absorbing unit; and, Fig. 10 is a sectional view taken on line 10—10 of Fig. 9, looking in the direction of the arrows;

Fig. 11 shows in elevation another form of the invention embodying the driving wheels of a vehicle, as for example, in a conventional rear end construction in which the wheels are mounted on a unitary axle housing; and, Fig. 12 is a top plan view of Fig. 11 with the cross-frame member omitted.

Fig. 13 is an elevational view of a further embodiment of the invention in which the driving wheels of the vehicle are provided with individual drive means;

Fig. 14 is a plan view of the swivel-type pivotal connection for the upper transverse wheel supports shown in the embodiment of Fig. 13;

Fig. 15 is a sectional view, partly in elevation, showing details of construction of the swivel-type pivotal connection of Fig. 14;

Fig. 16 is a close-up elevational view of the ball and socket coupling and pivotal connections by which the upper and lower wheel supports or load carrying arms, respectively, Fig. 13, are connected to the wheel hub housing; and, Fig. 17 is a plan view, partly in section, of the pivotal connection for the lower wheel support or load carrying arm, as viewed along line 17—17 of Fig. 16, looking in the direction of the arrows.

Generally described, the invention is directed to a vehicle body suspension wherein any pair of front and/or rear wheels, either steering or driving, is mounted in association with a spring suspension and shock absorbing unit pivotally connected to the vehicle frame intermediate the pair of wheels to absorb and reduce the effects of road shock to either wheel as such shock otherwise is distributed across the wheels and prevented from being transmitted to the vehicle body. The frame of the vehicle, in effect, is held in an approximately balanced position at all times as the wheels accommodate themselves, as necessary, to any uneven or irregular surface in the road, thus ensuring smooth, even riding qualities to the vehicle body. The shock absorbing unit between the pair of wheels embodies a spring cushioned barrel or cylinder having connected thereto a load carrying arm for each wheel across fulcrums provided on or defined by the vehicle frame. Thus, when one wheel is actuated upwardly in passing over an obstruction in the road, the spring cushioned barrel is designed to be pulled downwardly by the movement of the associated wheel arm over its fulcrum, thereby pulling the opposite wheel arm downwardly to force the weight of the vehicle body thereon as the spring cushioned barrel becomes free to assume its normal position incidental to the passing of the actuated wheel over the obstruction in the road and is more or less out of contact with the road. This action makes for a decided advantage over conventional vehicle suspensions in that it eliminates the necessity for shock absorbers and places very little twisting strain on the vehicle frame while the adverse effect of any road shock is neutralized from one wheel to the other in a manner whereby the vehicle body or frame has a relatively slight rising and falling action longitudinally thereof, rather than in an angular or slanting direction as in conventional vehicle suspensions which usually require special stabilizing bars to overcome the resultant swaying motion in addition to individual shock absorbers for each of the wheels.

Referring now, more particularly, to the drawings, the numeral 1, Figs. 1 and 2, designates generally the longitudinal side beams or rails which together with a cross member 10, of the general character shown in Fig. 3, provide the forward end of the vehicle frame. Said cross-frame member preferably is constructed substantially in the manner of a lattice girder structure for lightness in weight to comprise a lower base plate 11 and top plate 12 defining side channels 2 therebetween receiving the frame side beams or rails 1, in completing the vehicle frame. The top plate 12 includes a raised channel-shaped head 13 providing a pivot mounting for the spring suspension and shock absorbing unit, designated generally S, while the base plate 11 includes an opening 3 through which the barrel of said unit extends between fulcrums 14 dependent from said base plate. Said fulcrums 14 define pivots 15 for the lower wheel supports or load carrying arms, as seen in Fig. 1, while pivots 16 for the upper wheel supports are provided on the top plate 12 which otherwise is designed to accommodate the radiator R, represented by dotted lines in Fig. 3. The radiator R is supported by the rear of the base plate 11, as illustrated in Fig. 2, while brackets 17 projecting from the rear of said base plate 11 support the front end of the motor M adjacent to said radiator R with a suitable front grille (not shown), concealing all the foregoing described structure in the completely assembled vehicle.

While the steering wheels W at either the front or rear of the vehicle may be mounted in any desired manner, in the specific embodiment shown in Fig. 1, they are of the type journalled on a stub axle associated with a wheel hub housing 20 which carries spaced ears or gudgeons 21 pivotally connected to a steering knuckle 22 by a king pin 23. A yoke 24 formed as a part of said steering knuckle 22 has upper and lower projecting ends to which are pivotally connected lower and upper transverse wheel supports or load carrying arms extending from pivotal connections to said pivots 15, 16, respectively, on the frame, as presently to be described.

Figs. 5-7 inclusive illustrate an alternate wheel mounting arrangement comprising universal ball and socket couplings, designated generally 25, which are connected to the respective upper and lower wheel supports or load carrying arms and secured to the associated wheel hub housings 20 by bolts 26, Fig. 7, to provide a construction which is more or less equivalent to that illustrated in Fig. 1. In this instance, however, the cross-frame member 10' may be of somewhat different construction to include pivots 16' for the upper wheel supports projecting from the ends of the top plate thereof and lower pivots 15' provided directly on the base plate of said cross-frame member.

As shown in detail in Fig. 7, said ball and socket connections 25, are of the general character comprising a bearing block 27 and a hollow semispherical holder 28 defining a socket for the ball head 29 of a connecting rod or shaft 30, and otherwise including a peripheral flange for attachment to the wheel hub housing 20 by bolts 26. Said holder 28 may include a grease point 31 for lubricating purposes and an apertured shield or washer 32 covering the opening in the holder through which the rod 30 extends for universal movement with respect to said holder. A coil spring 33 telescoped over said rod 30 urges said shield 32 against the exterior of the holder to provide a waterproof and dustproof connection. The rod 30 has a flat side face for engagement by a wrench to rotate the same for adjustment purposes, and otherwise, is of a shape and length necessary to provide the desired connection to its associated wheel support. A preferred construction is provided by a threaded end portion of said rod 30 threaded into a bore 35 in the end of the associated wheel support and maintained in adjusted position therewith by a lock nut 36. By this construction, the correct camber of the wheels readily may be provided at any time simply by loosening the lock nut 36 and rotating the rod 30 to move inwardly or outwardly axially of said bore 35 as necessary to provide any required adjustment for this purpose, while the toe-in adjustment of the wheels is made by shortening or lengthening the drag links in the steering gear of the vehicle.

In the wheel mounting construction either of Fig. 1 or Fig. 5, an upper wheel support comprising a bifurcated lever structure is provided in the manner of a wishbone defining a pair of transverse load carrying arms 40 merging at one end into spaced pivot lugs 41, Figs. 1 and 2, which are pivotally connected to the upper end of the associated yoke 24. Similar pivot lugs 42 may be provided on the other ends of said arms 40 for pivotal connection to the pivots 16, Fig. 3, on the top plate of the cross frame member 10, and to pivots 43 supported on brackets 44, Fig. 2, welded, riveted or otherwise united to the side rails 1 of the chassis frame. A preferred construction embodies pivot rods 45 extending through the aligned openings in the pairs of pivot lugs 42 and pivots 16 and 43, respectively, and secured by adjusting nuts 46 threaded onto the extremities of said rods 45, thereby providing a simple construction whereby any required wheel caster easily may be provided merely by manipulating the nuts 46 to move the pivot rods 45 in the direction necessary to effect the desired adjustment of the wheels in this respect.

In Fig. 5, a similar construction is provided for the upper wheel supports or load carrying arms 40' by forming the same in the substantial configuration shown to be connected to the upper portions of the wheel hub housings 20 by ball and socket couplings 25, Fig. 7, as previously described, while the opposite ends thereof include pairs of pivot lugs 42' pivotally connected to forward pivots 16' on the upper plate of the cross-frame member 10', and rearward pivots carried by brackets united to the frame in an arrangement generally similar to that provided for the pivots 43 in the construction shown in Fig. 2.

The lower wheel supports, Figs. 1 and 6, are similarly provided in the manner of bifurcated lever structures or wishbones comprising a pair of transverse load carrying arm members 50, 51 merging into spaced pivot lugs 52, Fig. 1, pivotally connected to the lower ends of the yokes 24, or, as in Figs. 5 and 6, connected to the wheel hub housings 20 by ball and socket couplings 25, as described with reference to Fig. 7. The lower rear arm members 51, Fig. 6, are pivotally connected to pivots 53 carried by brackets 54 united to the side rails of the frame, while the lower front arm members 50 are pivotally secured intermediate their lengths by suitable pivot means 55 connected to the pivots 15, defined by the fulcrums 14, Fig. 1, or pivots 15', Figs. 5 and 6, provided directly on the lower plate of the cross-frame member. In either case, the ends of the lower front arm members 50 extending from said cooperating pivot means 55 are pivotally secured to links 56 which in turn are hingedly connected to ears 57, trunnions, or the like, suitably provided on the barrel or casing of the combined spring suspension and shock absorbing unit, S, in the relation and for the purposes hereinafter set forth.

The spring suspension and shock absorbing unit, S, as illustrated in detail in Figs. 8-10, inclusive, comprises a cylindrical casing or barrel 60 including a cylinder cap 61 removably threaded thereon and provided with an opening slidably receiving a tubular piston rod or shaft 62. A piston 63, provided with piston rings 64, is mounted for reciprocating movement in said cylinder or barrel 60 against the force of a main spring 65 surrounding a smaller overload spring 66 coiled around the piston rod 62 and secured at its upper end to the cylinder cap 61 by a clamp 67. The main coil spring 65 is retained in the casing or barrel 60 by the cylinder cap 61 and is of a size designed to exert normally a slight expansive spring force on said piston 63 and a slight tension on the piston rod 62 in its normal position with respect to the parts associated with said spring suspension and shock absorbing unit.

The piston rod 62 extends through the opening in the cylinder cap 61 and is held in proper alignment in the cylinder by roller guides or bearings 68 bordering said opening at the inner side of said cylinder cap 61 together with a seal or washer 69 at the outer side thereof closing said opening against the entrance of dust, moisture and other foreign matter, while a breather device 70 provides for normal atmospheric pressure within the upper portion of the chamber or cylinder. The tubular piston rod or shaft is of suitable length to be pivotally connected to the head 13 of the cross-frame member, 10, Fig. 1, as by means of a U-shaped bracket 75 secured to said rod by lock nuts 76 threaded over the end thereof and clamping the base of said bracket 75 on its opposite faces. A pivot bolt or pintle 77, Fig. 4, extends through openings in the channel-shaped head 13 of the cross-frame member aligned with openings in the sides of said bracket 75 to mount the spring suspension and shock absorbing unit in the desired pivotal connection to the frame substantially in the manner shown in either Figs. 1 or 5.

The outer end of the tubular piston rod or shaft 62 is provided with a two-way adjustable pressure and vacuum relief valve, designated generally 80, adapted to relieve any intense pressure and consequent extraordinary vacuum within the shock absorbing cylinder 60 due to a sudden, rapid actuation thereof, as when either wheel encounters a large obstacle or passes over a deep depression in the road. The valve body 80 is secured into the outer end of the tubular piston rod 62, as by means of an external thread, and is provided with an open plug 81 received in an internally threaded bore merging with a bore 82 of reduced size which receives a two-way valve device comprising an air outlet disc 83 and an air inlet disc 84. The outlet disc 83 is seated on a shoulder defined by the valve body and overlies outlet air passages 85 extending longitudinally in said body in spaced concentric relation to the bore 82. Said outlet disc 83 forms a part of a reciprocable valve gland 87 having longitudinally extending inlet air passages 88 and defining a seat on its lower end for the air inlet disc 84 in overlying relation to said inlet air passages 88. The inlet disc 84 is carried by a valve stem 90 extending through an axial recess in the valve gland 87, and a spring 91 retained on said valve stem 90 by nut 92, urges said inlet disc 84 upwardly to normal position closing the inlet air passages 88 in said valve gland 87, while a larger concentrically arranged spring 93 retained by the open plug 81 bears upon the outlet disc 83 to urge the same to normal position closing the outlet air passages 85 in the valve body.

In operation, it will be understood that from any road shock to either wheel causing the barrel 60, Fig. 8, of the shock absorbing unit to move downwardly relatively to the piston 63, the main coil spring 65 is compressed, with the smaller coil spring 66 becoming active to compensate for any overload. Upon return of the parts of the unit to normal position under the expansive force of said springs, air in the bottom of the cylinder 60 is under great compression by the piston 63 and can be relieved only by passing through the tubular piston rod or shaft 62 to the relief valve 80. Said valve 80, Fig. 9, prevents any violent escapement of the compressed air in a manner whereby such air impinges upon the disc 84 engaging the lower end of the valve gland 87 to force said valve gland upwardly against spring 93 to cause the outlet disc 83 thereof to space from its seat and thereby uncover the outlet air passages 85 in the valve body. The compressed air thus escapes by such passages 85 through the open plug 81 until the pressure in the cylinder is relieved, whereupon said outlet air passages are closed by said disc 83 returned to its normal position under the expansive force of spring 93.

The inlet valve disc 84 thereupon becomes effective to overcome any vacuum within the cylinder 60 in a manner whereby air under atmospheric pressure enters the inlet air passages 88 in the valve gland 87 and forces the disc 84 to uncover said passages as long as necessary to relieve such vacuum simultaneously with return of the parts of the spring suspension and shock absorbing unit and associated structure to normal position.

From the foregoing, it will be appreciated that the mounting arrangement of the spring suspension and shock absorbing unit, S, in a pivotal connection to the cross-frame member 10 and intermediate the wheels by links 56 and lower wheel supports 50 cooperating with upper wheel supports 40, provides for a slight, generally perpendicular or gentle rising and falling movement of the associated frame structure when either wheel passes over an obstruction in the road. Any actuation resulting in a sudden upward movement of one wheel causes the suspension unit, S, to operate in the manner just described and otherwise move the barrel or casing 60 thereof downwardly carrying the lower wheel supporting arm of the opposite wheel downwardly therewith, thereby forcing a certain amount of the suspended weight of the vehicle against this arm through said spring suspension unit S. In this respect, the main spring 65, Fig. 8, of said spring suspension unit absorbs and dampens a certain amount of the road shock to the actuated wheel as said unit otherwise transmits any excess force of the road shock from the actuated wheel to the wheel supporting means of the other wheel in a manner whereby such shock is neutralized by being substantially equally distributed between the wheels and thereby prevented from being transmitted to the vehicle body. This results in the aforesaid gentle rising and falling motion or relatively slight, generally perpendicular movement of the associated frame structure which ensures smooth, even riding qualities to the vehicle body and advantageously prevents torsional twists in the frame itself with the consequent further advantage that a lighter, less expensive frame structure may be employed than in conventional vehicle suspensions.

In a visualization of the general shock absorbing action of the spring suspension unit, S, it is apparent when one wheel is passing over an object, compressing the main spring 65, Fig. 8, as aforesaid, and causing the barrel 60 to travel downwardly, it forces the opposite load carrying arm or wheel support downwardly therewith by transferring the weight of the vehicle to this arm and against the expansive force of said main spring 65 at a time when said spring is expanding and attempting to return to normal position by reason of the fact the actuated wheel is just passing over the object in its path and momentarily is out of contact with the road during an instant in which it carries none of the load. The road shock, in any event, is thus absorbed and neutralized between the pair of wheels in a manner whereby the spring action thereby provided involves a decided advantage over the spring action in conventional vehicles inasmuch as it eliminates the necessity for individual shock absorbers. The effectiveness of the shock absorbing action is materially increased by the piston construction 63 on which the springs 65, 66 directly bear, and which is provided with the rings 64 which set up sufficient friction to slow the action of said spring 65 in its travel, and further, works against the compression created by its reciprocations in the cylinder to prevent said spring from being completely compressed as when passing over a large object or into a deep depression in the road. In this respect, the smaller coil spring 66 within the main spring 65, being shorter, becomes effective on any overload or otherwise, when the vehicle is loaded beyond its normal capacity.

The combined spring suspension and shock absorbing unit of the present invention is further advantageous in making for considerably reduced costs of manufacture by supplanting, in any event, two springs and two shock absorbers required in conventional wheel suspension arrangements, while otherwise providing a simplified compact wheel mounting construction having a fixed caster, camber, and toe-in-position which is unchanged by the movement of the wheels in relation to the chassis frame, thereby reducing the wear on the tires to a minimum. It will be apparent that by locating the pivots 15, Fig. 1, nearer the suspension unit, S, than to the road wheels, the ratio of leverage will be such that either wheel may pass easily over objects in the road and at the same time cause the barrel 60 of the unit to travel downwardly only about one-third the distance the actuated wheel travels upwardly such that there is relatively little disturbance of the vehicle frame or body itself, and the use of a smaller spring construction within the barrel or casing 60 is permitted inasmuch as the travel requirement thereof is reduced.

The advantages of the spring suspension and shock absorbing construction of the present invention may be appreciated better in a comparison of the action thereof to that of spring suspensions in conventional vehicles provided by individual leaf spring or coil spring units which, when either wheel passes over an object in the road at high speed, have a tendency to throw the car body into the air from that corner in a diagonal or slanting direction, thereby putting objectionable twisting strains on the frame, and setting up rapid pronounced oscillations which require the provision of shock absorbers to dampen this objectionable effect. In contrast, by means of the mechanical movement of the suspension of the present invention, any such adverse effect is much more moderate in that when the actuated wheel rises on encountering an obstruction, the lever action of the load carrying arms is such that the associated vehicle frame and body structure has only a slight generally perpendicular or gentle rising and falling motion. Also, stabilizing bars are required in conventional vehicles to prevent side sway in the vehicle body, as when rounding a curve, whereas in the construction of the present invention, such stabilizing means are unnecessary since the lever action of the wheel supports or load carrying arms provides each side of the vehicle chassis with what may be termed an equalized squatting movement in such instances during which the center of gravity of the vehicle is brought advantageously closer to the road while the spring suspension unit yields as necessary during the downward travel of the spring cushioned barrel thereof because of the weight delivered thereto by the centrifugal force necessarily set up as the vehicle rounds the curve.

Figs. 11 and 12 disclose the arrangement of the spring suspension and shock absorbing unit of the invention as provided for the driving wheels of a vehicle in a conventional rear end construction, for example, comprising an axle housing 100, mounting the driving wheels W', and associated with a central differential housing 101 connected to the drive shaft tube 102. The vehicle frame embodies the rear ends of the side beams or rails 1 and a cross-frame member 105 united thereto comprising a channel-shaped head 106 providing a pivotal suspension for the bracket 75 attached to the piston rod or shaft 62 of the spring suspension and shock absorbing unit, S. Pivots 110 extend from the underside of said cross-frame member for pivotal connection to suitable cooperating pivots or bearings 111, intermediate the lengths of transverse load carrying arms 112, 113, while links 116 pivotally connect the inner ends of said arms to the ears 57 on the barrel or casing of the spring suspension and shock absorbing unit, S, to mount the associated frame structure substantially in the manner described with reference to Fig. 1.

The outer ends of said transverse arms 112, 113, are secured adjacent the wheels W' by means of collars 115 embracing the axle housing 100 and which include pivotal connections 116 for radius rods 117 that are pivotally secured to the frame side rails by shackle bolts 118 to hold the axle housing in line in the completed assembly while permitting the necessary rising and falling action of either of the wheels in passing over obstructions or depressions in the road. Projecting shoulders 119 on each of the collars 115 provide bearing means for attaching the outer ends of the transverse load carrying arms 112, 113, adjacent the wheels W' in a manner whereby said arms are adapted to receive any road shock to either of said wheels and transfer the same to the spring suspension and shock absorbing unit, S, to be dampened thereby and otherwise substantially equally distributed across said wheels without being transmitted to the vehicle body. The outer end of transverse arm 112 is pivotally connected to its associated shoulder 119 by means of a bearing neck 120 and shackle links 121, thereby providing for limited swinging movement thereof in cooperation with the opposite transverse arm 113 having a fixed pivotal connection 122 to pivot lugs 123 provided on the associated bearing shoulder 119 to prevent body travel laterally.

The spring suspension unit, S, is pivotally mounted to swing laterally on its bracket mounting 75 relatively to the cross-frame member 105 as the links 116 provide for any required lever action of the transverse load carrying arms 112, 113, when moved upwardly or downwardly incidental to road shock imparted to either wheel. The links 116 also may be designed to have sufficient play to provide for slight movement of the wheels without actuating the spring suspension unit, but in the event either wheel encounters a pronounced obstruction or depression in the road, the resultant road shock is received by the associated transverse arm 112, 113 and transmitted to the other arm through the intermediate spring suspension and shock absorbing unit, S, which equalizes such shock across the wheels, substantially in the manner and for the purposes described with reference to the forms of the invention shown in Figs. 1 and 5.

Figs. 13-17 inclusive show a further embodiment of the invention, as provided for a driving wheel suspension in either a front or rear drive vehicle, wherein separate drive shafts 130 extend from the vehicle transmission to suitable gearing within casings 131 associated with the wheel hub housings 132 for the respective wheels W'', Fig. 13. The wheels are thus provided with individual drive means while otherwise being independently movable in association with the intermediate spring suspension and shock absorbing unit, S, in the same general manner as the previously described forms of the invention.

The cross-frame member 135 may comprise the same general type of lattice girder structure to connect with the adjacent ends of the frame side rails or beams 1. The cross-frame member 135 includes a channel-shaped head 136 which provides a pivotal suspension for the bracket 75 attached to the piston rod or shaft 62 of the spring suspension and shock absorbing unit, S, in a manner similar to that shown in Fig. 4. Pivots 137 extend from the underside of said cross-frame member for pivotal connection to suitable cooperating pivot means 138 provided intermediate the lengths of the lower transverse wheel supports or load carrying arms 150, while links 139 pivotally connect the inner ends of said arms to the ears 57 on the barrel of the spring suspension and shock absorbing unit in a construction generally similar to that described with reference to Fig. 1.

The inner ends of upper wheel supports or load carrying arms 140 are connected to the cross-frame member by swivel-type pivots 141, as shown in detail in Figs. 14 and 15, comprising a flanged washer or plate 142 united to the cross-frame member 135 as by rivets 143, and having a bushing or sleeve 144 receiving a pivot post 145 secured in said sleeve, as by a transverse cotter pin 146. The pivot post 145 thus has a swivel mounting in the sleeve or bushing 144 and relatively to the cross-frame member 135, while the outer end thereof defines a pivot head 147 receiving a pintle bolt 148 for pivotally connecting thereto spaced pivot lugs or bearing necks 149 on the inner ends of said arms 140. The outer ends of said arms 140 are pivotally connected to the wheel hub housings 132, Figs. 13 and 16, by ball and socket couplings 25, in a construction similar to that shown and described with reference to Figs. 5 and 7.

The outer ends of lower transverse arms 150 are provided with pivotal connections 151 to the wheel hub housings 132 by means of flanged plates 152 bolted to said housings and carrying spaced pivot lugs 153 pivotally connected by pintles 154 to pivot heads 155 provided on the extremities of said arms 150. In a preferred arrangement, Fig. 17, such a pivot head structure is defined by a bolt 156 extending through a longitudinal bore 157 merging with a transverse slot 158 in an enlargement on the end of the arm 150. The bolt 156 thus is secured by a nut 159 applied thereto through said slot 158 together with a set screw 160 locking the connection. By this arrangement the nut 159 easily may be manipulated through the slot 158 to provide for any necessary adjustment at the end of the associated wheel support or load carrying arm 150.

The individually driven wheels W'', thus mounted in combination with the spring suspension and shock absorbing unit, S, suspended from the vehicle frame intermediate the pair of wheels, are thus adapted for the transmission of road shock from one wheel to the other in a manner whereby said wheels are capable of mutually balancing one another while the shock is absorbed and substantially equalized and neutralized between the wheels in the general function and operation described in detail with reference to the embodiment of the invention shown in Fig. 1.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. In a vehicle comprising a chassis having a pair of wheels at opposite sides thereof, a frame member, a spring suspension and shock absorbing unit mounted by said frame member between the pair of wheels, transverse load carrying arms pivoted intermediate their ends to said frame member, means for connecting the outer ends of said arms in association with said wheels for movement in response to road shock to either of said wheels, and means for pivotally connecting the inner ends of said arms to said spring suspension and shock absorbing unit, said unit comprising a piston, a piston chamber, and spring means for cushioning relative movement of said piston and piston chamber upon road shock from either of the vehicle wheels transmitted to said unit by said load carrying arms, and means associated with said unit for relieving the pressure and vacuum created in the piston chamber incidental to such relative movement of the piston and piston chamber.

2. In a vehicle comprising a chassis having a pair of wheels at opposite sides thereof, a frame member, a spring suspension and shock absorbing unit mounted by said frame member between the pair of wheels, bifurcated load carrying members for each wheel comprising arms pivoted intermediate their ends to said frame member, means connecting the outer ends of said arms in association with said wheels for movement in response to road shock to either of said wheels, and links pivotally connected to the inner ends of said arms and attached to said spring suspension and shock absorbing unit, said unit comprising a piston, a piston chamber, and spring means for cushioning the relative movement of said piston and piston chamber.

3. In a vehicle comprising a chassis having a pair of wheels at opposite sides thereof, a frame member, a spring suspension and shock absorbing unit mounted by said frame member between the pair of wheels, bifurcated load carrying members for each wheel comprising an arm pivoted intermediately and an arm pivoted adjacent one end to said frame member, means connecting the outer ends of said intermediately pivoted arms in association with said wheels for movement in response to road shock to either of said wheels, and links pivotally connected to the inner ends of said intermediately pivoted arms and attached to said spring suspension and shock absorbing unit, said unit comprising a piston, a piston chamber, and spring means for cushioning relative movement of said piston and piston chamber upon road shock from either of the vehicle wheels transmitted to said unit by said load carrying members.

4. In a vehicle comprising a chassis having a pair of wheels at opposite sides thereof, a frame member, a spring suspension and shock absorbing unit mounted by said frame member between the pair of wheels, bifurcated load carrying members for each wheel comprising an arm pivoted intermediately and an arm pivoted adjacent one end to said frame member, means connecting the outer ends of said intermediately pivoted arms in association with said wheels for movement in response to road shock to either of said wheels, and means pivotally connecting the inner ends of said intermediately pivoted arms to said spring suspension and shock absorbing unit, said unit comprising a piston, a piston chamber, and spring means for cushioning relative movement of said piston and piston chamber upon road shock from either of the vehicle wheels transmitted to said unit by said load carrying members, and valve means associated with said unit for relieving the pressure and vacuum created in the piston chamber incidental to such relative movement of the piston and piston chamber.

5. In a vehicle comprising a chassis having a pair of wheels at opposite sides thereof, a frame member, a spring suspension and shock absorbing unit mounted by said frame member between the pair of wheels, upper and lower wheel supports for each wheel extending from opposite sides of said frame member, the lower wheel supports comprising load carrying arms pivoted intermediate their ends to said frame member, and means pivotally connecting the inner ends of said arms to said spring suspension and shock absorbing unit, said unit comprising a piston, a piston chamber, and spring means for cushioning relative movement of said piston and piston chamber upon road shock from either of the vehicle wheels transmitted to said unit by said load carrying arms.

6. In a vehicle comprising a chassis having a pair of wheels at opposite sides thereof, a frame member, a spring suspension and shock absorbing unit mounted by said frame member between the pair of wheels, upper and lower wheel supports for each wheel extending from above and below said frame member, the lower wheel supports comprising load carrying arms pivoted intermediate their ends to said frame member, ball and socket couplings connecting the outer ends of said arms in association with said wheels for movement in response to road shock to either of said wheels, and means pivotally connecting the inner ends of said arms to said spring suspension and shock absorbing unit, said unit comprising a piston, a piston chamber, and spring means for cushioning relative movement of said piston and piston chamber.

7. In a vehicle comprising a chassis having a pair of wheels at opposite sides thereof, a frame including a cross-frame member, a spring suspension and shock absorbing unit mounted by said cross-frame member between the pair of wheels, upper and lower wheel supports for each wheel, said upper supports comprising bifurcated lever members mounting the wheels at one end and pivotally connected to the vehicle frame, said lower wheel supports comprising bifurcated lever members including load carrying arms pivoted intermediate their ends to said cross-frame member, means connecting the outer ends of said arms in association with said wheels for movement in response to road shock to either of said wheels, and means pivotally connecting the inner ends of said arms to said spring suspension and shock absorbing unit.

8. In a vehicle comprising a chassis having a pair of wheels at opposite sides thereof, a frame including a cross-frame member, a spring suspension and shock absorbing unit mounted by said cross-frame member between the pair of wheels, upper and lower wheel supports for each wheel, said upper supports comprising bifurcated lever members mounting the wheels at one end and pivotally connected to the vehicle frame, said lower wheel supports comprising bifurcated lever members including load carrying arms pivoted intermediate their ends to said cross-frame member, means connecting the outer ends of said arms in association with said wheels for movement in response to road shock to either of said wheels, and means comprising links attached to said spring suspension and shock absorbing unit and pivotally connected to the inner ends of said arms.

9. In a vehicle comprising a chassis having a pair of wheels at opposite sides thereof, a frame including a cross-frame member, a spring suspension and shock absorbing unit mounted by said cross-frame member between the pair of wheels, upper and lower wheel supports for each wheel, said upper supports comprising bifurcated lever members mounting the wheels at one end and pivotally connected to the vehicle frame, said lower wheel supports comprising bifurcated lever members including load carrying arms pivoted intermediate their ends to said cross-frame member and means pivotally connecting the inner ends of said arms to said spring suspension and shock absorbing unit, said unit comprising a piston, a piston chamber, and spring means for cushioning relative movement of said piston and piston chamber upon road shock from either of the vehicle wheels transmitted to said unit by said load carrying arms.

10. In a vehicle comprising a chassis having a pair of wheels at opposite sides thereof, a frame including a cross-frame member, a spring suspension and shock absorbing unit mounted by said cross-frame member between the pair of wheels, upper and lower wheel supports for each wheel, said upper supports comprising bifurcated lever members mounting the wheels at one end and pivotally connected to the vehicle frame, said lower wheel supports comprising bifurcated lever members including load carrying arms pivoted intermediate their ends to said cross-frame member and means pivotally connecting the inner ends of said arms to said spring suspension and shock absorbing unit, said unit comprising a piston, a piston chamber, and spring means for cushioning relative movement of said piston and piston chamber upon road shock from either of the vehicle wheels transmitted to said unit by said load carrying arms, and means associated with said unit for relieving the pressure and vacuum created in the piston chamber incidental to such relative movement of the piston and piston chamber.

11. In a vehicle comprising a chassis having a pair of wheels on wheel axles at opposite sides thereof, a frame including a cross-frame member, a spring suspension and shock absorbing unit mounted by said cross-frame member between the pair of wheels, load carrying arms pivoted intermediate their ends to said cross-frame member, means pivotally connecting the inner ends of said arms to said spring suspension and shock absorbing unit, means at the outer end of one of said arms providing a fixed pivot therefor with respect to the associated wheel axle, and means at the outer end of the other arm including a shackle link providing a pivotal connection having limited swinging movement relative to the wheel axle associated therewith in cooperation with said arm having a fixed pivot.

12. In a vehicle, a transverse unitary axle housing and a pair of wheels mounted thereby at opposite sides of the vehicle chassis, a frame including a cross-frame member, a spring suspension and shock absorbing unit mounted by said cross-frame member between the pair of wheels, means carried by said axle housing defining a pivot adjacent each wheel, load carrying arms pivoted intermediate their ends to said cross-frame member, means pivotally connecting the inner ends of said arms to said spring suspension and shock absorbing unit, and means providing a pivotal connection of the outer end of each arm to said pivots carried by the axle housing, one of said pivotal connections comprising a shackle link construction adapted for limited swinging movement.

JAMES E. CASNER.